(12) United States Patent
Becker et al.

(10) Patent No.: US 10,808,735 B2
(45) Date of Patent: Oct. 20, 2020

(54) TRANSMISSION PARK VALVE WITH STEEL SADDLE

(71) Applicant: Ford Global Technologies, LLC, Dearborn, MI (US)

(72) Inventors: Lee John Becker, Canton, MI (US); Timothy Andrew Sikowski, China Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 127 days.

(21) Appl. No.: 16/137,900

(22) Filed: Sep. 21, 2018

(65) Prior Publication Data

US 2020/0096017 A1 Mar. 26, 2020

(51) Int. Cl.
| | |
|---|---|
| F15B 13/04 | (2006.01) |
| F16H 63/34 | (2006.01) |
| F15B 13/01 | (2006.01) |
| F16H 63/48 | (2006.01) |
| F16K 11/07 | (2006.01) |

(52) U.S. Cl.
CPC ........ F15B 13/0402 (2013.01); F15B 13/015 (2013.01); F16H 63/3433 (2013.01); F16H 63/3475 (2013.01); F16H 63/483 (2013.01); *F15B 2211/7052* (2013.01); *F15B 2211/72* (2013.01); *F16K 11/0704* (2013.01)

(58) Field of Classification Search
CPC ............................... F15C 3/02; F16K 11/0704
See application file for complete search history.

(56) References Cited

U.S. PATENT DOCUMENTS

| | | | | |
|---|---|---|---|---|
| 3,605,809 A | * | 9/1971 | Thorson | F16K 11/0704 137/624.27 |
| 3,724,500 A | * | 4/1973 | Hubbard | F16K 11/0704 137/624.18 |
| 4,239,058 A | * | 12/1980 | Peters | F16K 11/0704 137/458 |
| 4,274,443 A | * | 6/1981 | Faix | F15B 13/0402 137/625.6 |
| 5,738,142 A | | 4/1998 | Eike et al. | |
| 6,722,385 B1 | * | 4/2004 | Bolaski | F15B 13/0402 137/15.17 |
| 7,752,935 B2 | * | 7/2010 | Vernacchia | F16H 61/2807 74/335 |
| 8,012,063 B2 | | 9/2011 | Powell et al. | |
| 8,932,167 B2 | | 1/2015 | Berger et al. | |
| 9,114,790 B2 | | 8/2015 | Kinch et al. | |

(Continued)

*Primary Examiner* — Mark A Manley
(74) *Attorney, Agent, or Firm* — Vincent N. Mastrogiacomo; Brooks Kushman P.C.

(57) ABSTRACT

A hydraulic park system includes a spool valve linked to a park mechanism. In some circumstances, a hold-out-of-park mechanism is utilized to hold the spool in position. To avoid wear on the aluminum spool, a steel saddle is inserted onto the spool between two lands such that the hold-out-of-park mechanism engages the steel saddle. The steel saddle is inserted from the side of the spool. To ensure that the hold-out-of-park engages the correct side of the saddle, the saddle must be held in a predefined circumferential position about the bore axis. The saddle is constrained from rotation about the spool axis by abutting flat surfaces on the spool and the saddle. The spool is constrained from rotation relative to the bore by the park mechanism.

15 Claims, 8 Drawing Sheets

(56) References Cited

U.S. PATENT DOCUMENTS

| | | | |
|---|---|---|---|
| 9,512,919 B2 | 12/2016 | Kinch | |
| 2003/0227287 A1* | 12/2003 | Hori | G01D 5/242 |
| | | | 324/207.25 |
| 2005/0081670 A1* | 4/2005 | Kozu | F16H 61/32 |
| | | | 74/473.1 |
| 2017/0037877 A1* | 2/2017 | Brewer | F16K 11/07 |

* cited by examiner

TRANSMISSION PARK VALVE WITH STEEL SADDLE

TECHNICAL FIELD

This disclosure relates to the field of hydraulic control systems for automatic transmissions for motor vehicles. More particularly, the disclosure relates to a park valve with an aluminum spool carrying a steel saddle that engages with a holding mechanism.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low. However, there are some conditions in which the transmission may over-ride the driver selection.

SUMMARY OF THE DISCLOSURE

A transmission valve includes a housing, a spool, a saddle, and a holding mechanism. The housing defines a bore. The spool is supported to slide within the bore and defines a plurality of lands. The spool may be attached to a park mechanism which may constrain the spool and saddle against rotation. The saddle is mounted to the spool between two lands of the plurality of lands. A flat surface of the saddle abuts a flat surface of the spool to prevent relative rotation. The spool and the housing may be made of a first material, such as aluminum. The saddle may be made of a second material, such as steel, with a hardness greater than that of the first material. The holding mechanism is configured to selectively engage the saddle to prevent movement of the spool with respect to the housing. The holding mechanism may include a pin, a spring, and a solenoid. The pin is supported to slide with respect to the housing into and out of engagement with the saddle. The spring biases the pin toward engagement with the saddle. The solenoid is configured to hold the pin in engagement with the saddle.

A transmission park valve includes an aluminum housing, an aluminum spool, a steel saddle, and a hold-out-of-park mechanism. The aluminum housing defines a bore. The aluminum spool has a plurality of lands and is supported to slide within the bore between an in-park position and an out-of-park position. The spool may be attached to a park mechanism. The steel saddle is mounted to the spool between two lands of the plurality of lands and is constrained against rotation relative to the spool. The spool and the saddle may be constrained against rotation within the bore. The hold-out-of-park mechanism is configured to selectively engage the saddle to hold the spool in the in-park position. The hold-out-of-park mechanism may include a pin, a spring, and a solenoid. The pin is supported to slide with respect to the housing into and out of engagement with the saddle. The spring biases the pin toward engagement with the saddle. The solenoid is configured to hold the pin in engagement with the saddle.

A method of assembling a transmission includes installing a saddle onto a spool, inserting the spool and saddle into a bore, constraining the spool against rotation, and installing a holding mechanism. The saddle is installed between two lands of the spool. A flat surface of the saddle abuts a flat surface of the spool to prevent relative rotation. The spool may be constrained against rotation by attaching it to a park mechanism. The holding mechanism is configured to selectively engage the saddle to prevent movement of the spool with respect to the bore. The spool and the housing may be made of a first material, such as aluminum. The saddle may be made of a second material, such as steel, with a hardness greater than that of the first material.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
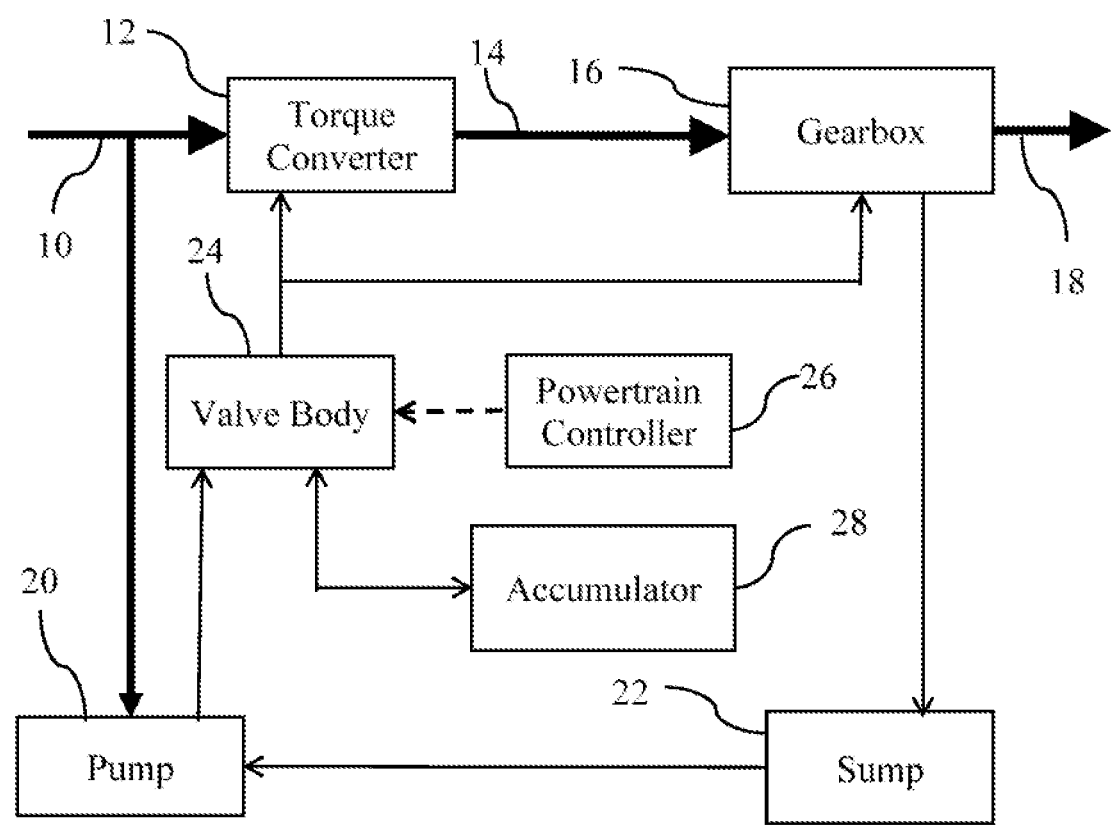
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lines represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output shaft 18. Each power flow path may be established by engaging a specified subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

Most of the shift elements within gearbox 16 are engaged by supplying hydraulic fluid at an elevated pressure to a clutch apply chamber. (Gearbox 16 may also include passively engaged one-way clutches or electrically actuated elements.) Each shift element may include a clutch pack having friction plates splined to one component interleaved with separator plates splined to a different component. The pressurized fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

To reduce energy consumption, the internal combustion engine may be shut off when the vehicle is stopped, such as when waiting at a stop light. The engine is then restarted when the driver releases the brake pedal. To ensure that the powertrain is ready to transmit power as soon as the engine is started, it is desirable to maintain some shift elements in an engaged state while the engine is off. To accomplish that, pressurized fluid is allowed to flow into accumulator 28 when the engine is running and then returned to the valve body 24 when the engine is off.

Figure 2:
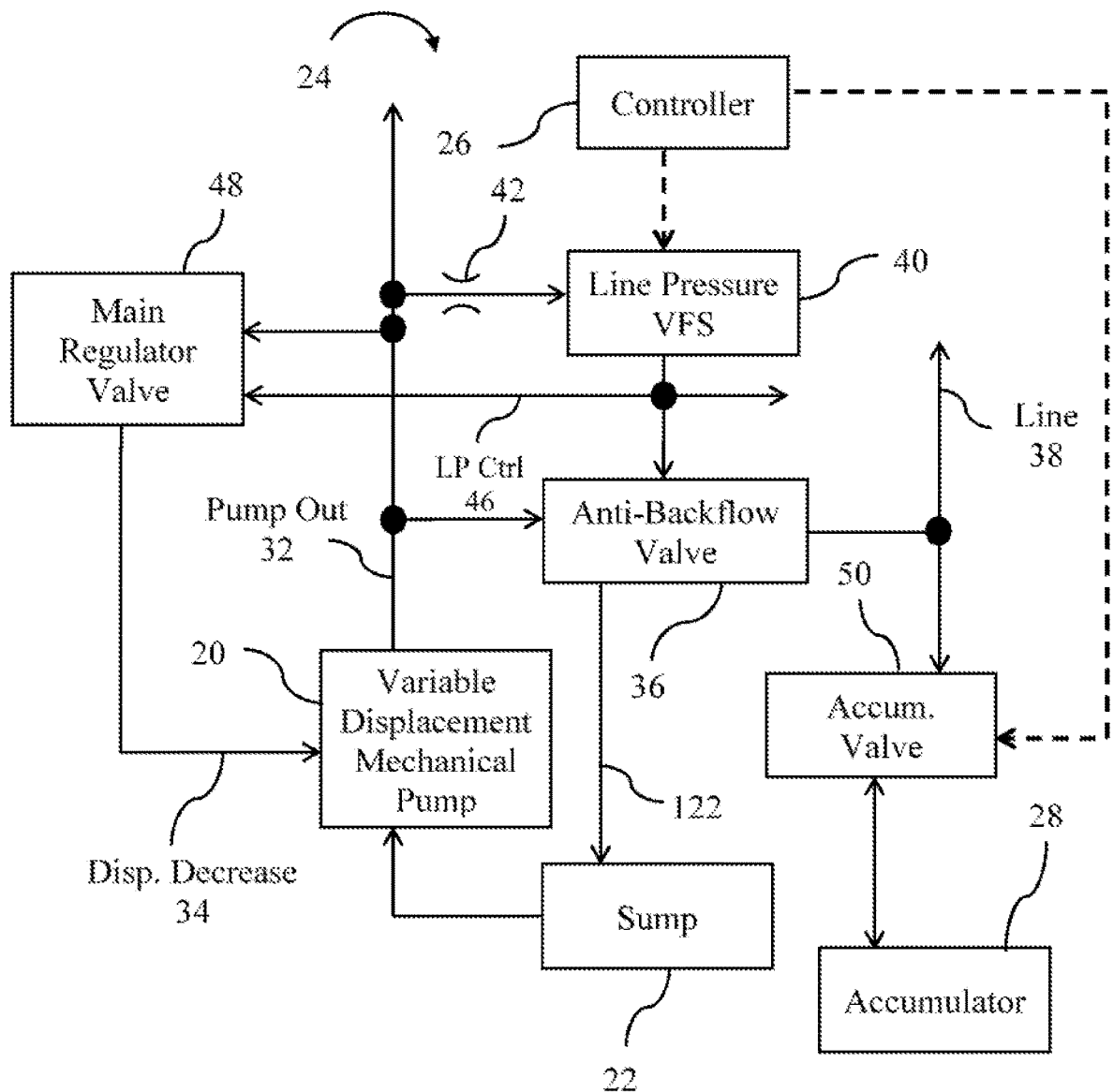
FIG. 2 is a schematic diagram of a fluid supply subsystem of a hydraulic control system for the transmission of FIG. 1.

FIG. 2 schematically illustrates a portion of valve body 24 that constitutes a fluid supply subsystem. A similar fluid supply subsystem is discussed in U.S. Patent Application Publications 2013/0014498 and 2013/0017112 which are incorporated by reference in their entirety herein. Pump 20, which is driven by the transmission input shaft, draws fluid from sump 22 and delivers the fluid to pump out circuit 32. Pump 20 is a positive displacement pump. Disregarding leakage, positive displacement pumps deliver a certain amount of fluid per revolution of the pump shaft regardless of the relative pressure at the pump inlet and pump outlet. The amount of fluid delivered per revolution is called the pump displacement. The displacement of pump 20 varies within predefined limits based on the pressure in displacement decrease circuit 34. The torque required to rotate the pump shaft increases as the pressure at the pump outlet increases relative to the pressure at the inlet and also increases in proportion to the pump displacement.

During normal operation, anti-backflow valve 36 is open such that fluid flows freely from the pump out circuit 32 to the line pressure circuit 38 and the pressure in the two circuits is substantially equal. The controller 26 adjust the pressure in these two circuits by sending a command to line pressure Variable Force Solenoid (VFS) 40. Fluid flows from the pump out circuit 32, through an orifice 42, through a valve opening in line pressure VFS 40 and then into LP Ctrl circuit 46. The pressure drop from the pump output circuit 32 to the LP Ctrl circuit 46 varies depending upon the size of the opening in line pressure VFS 40. The size of the opening in line pressure VFS 40 varies based on movement of a spool. Electrical current from controller 26 creates a magnetic force on the spool tending to enlarge the opening. Fluid in the LP Ctrl circuit 46 acts on an area of the spool to create a force tending to reduce the size of the opening. An equilibrium is reached at which the pressure in the LP Ctrl circuit 46 is proportional to the electrical current.

Main regulator valve 48 adjusts the displacement of pump 20 in order to maintain the pressure in pump out circuit 32 proportional to the pressure in the LP Ctrl circuit 46. Pressure in the LP Ctrl circuit 46 generates a force on a spool in main regulator valve 48. Pressure in the pump out circuit 32 generates a force on the spool valve in the opposite direction. When the pressure in the pump out circuit 32 exceeds the pressure in the LP Ctrl circuit 46, the spool moves to allow flow from pump out circuit 32 to displacement decrease circuit 34. Pressure in circuit 34 causes a reduction in the flow rate from pump 20 into the pump out circuit 32. Components fed by the pump out circuit 32 and the line pressure circuit 38 establish a relationship between the pressure in these circuits and the flow rate. Consequently, the reduction in flow rate results in a reduction in the pressure in pump out circuit 32 until an equilibrium is reached.

When the vehicle is stopped, such as when waiting at a traffic light, powertrain controller 26 may shut off the engine to conserve fuel. When the driver again demands torque by releasing the brake and depressing the accelerator pedal, the controller restarts the engine. In order to respond quickly after the engine is restarted, it is important to maintain some clutches in an engaged state. Fluid flow to maintain these clutches is provided by accumulator 28 which feeds line pressure circuit 38 via accumulator control valve 50. When the engine is running and the pressure in the line pressure circuit exceeds the pressure in the accumulator, controller 26 opens valve 50 to charge the accumulator. In some embodiments, charging of the accumulator may be accomplished passively by a check valve in parallel with valve 50. During engine shutdown periods, controller 26 pressurizes line pressure circuit 38 by opening valve 50. During these engine shutdown periods, controller 26 also sets the current to line pressure VFS 40 to an intermediate level causing the pressure in LP Ctrl circuit 46 to be at an intermediate level. In response to this reduction in LP Ctrl pressure, the spool of anti-backflow valve 36 moves to a position in which the line pressure circuit is isolated from the pump out circuit 32, reducing the number of components that must be fed by the accumulator. In circumstances that will be described below, controller 26 may set the current to line pressure VFS 40 to a low level which moves the spool of the anti-backflow valve 36 to a position in which the line pressure circuit 38 is isolated from the pump out circuit 32 and fluidly connected to vent circuit 52. In this condition, the pressure in line pressure circuit 38 drops rapidly to ambient pressure.

Figure 3:
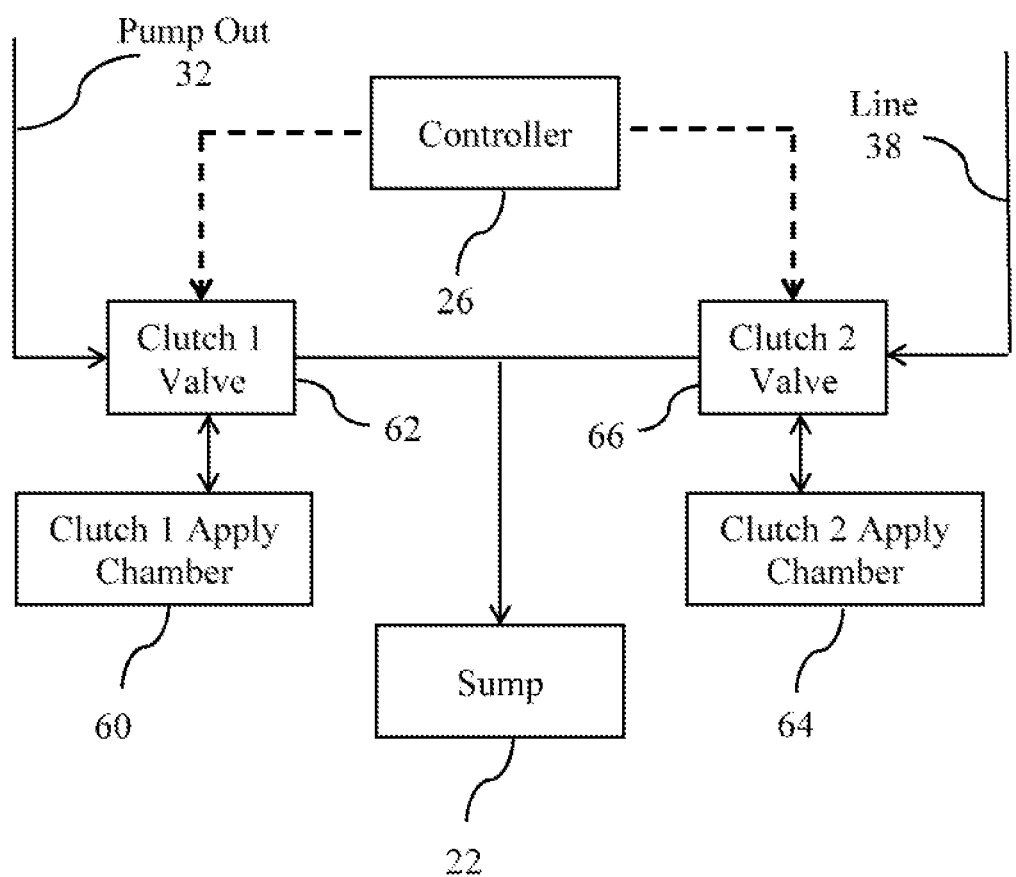
FIG. 3 is a schematic diagram of a portion of the shift element control subsystem of a hydraulic control system for the transmission of FIG. 1.

FIG. 3 schematically illustrates a portion of a clutch control subsystem. The clutch apply chamber of a first shift element 60 is supplied from the pump out circuit 32 via a VFS valve 62. As a result, shift element 60 can only be applied when the engine is running. To engage the shift element, the controller commands valve 62 to set the pressure of the clutch apply chamber to a value between zero and the pressure in pump out circuit 32. The controller adjusts the pressure by adjusting a current to a solenoid in valve 62. When the current is set to zero, valve 60 isolates the clutch apply chamber from pump out circuit 32 and connects clutch apply chamber 60 to sump 22 thereby allowing the fluid to escape to release the clutch. Although a single valve is shown for simplicity, the system may include a latch valve or other supplemental valves. Similarly, the clutch apply chamber of a second shift elements 64 is supplied from the line pressure circuit 38 via a VFS valve 66. As a result, shift element 64 can be applied even when the engine is not running. To engage clutch 2, the controller commands valve 66 to set the pressure of the clutch apply chamber 64 to a value between zero and the pressure in line pressure circuit 38. The controller adjusts the pressure by adjusting a current to a solenoid in valve 66. When the current is set to zero, valve 66 isolates the clutch apply chamber from pump out circuit 32 and connects clutch apply chamber 64 to sump 22 thereby allowing the fluid to escape to release the clutch. Additional shift elements are controlled similarly, some supplied by the line pressure circuit 38 and some supplied by the pump out circuit 32.

Figure 4:
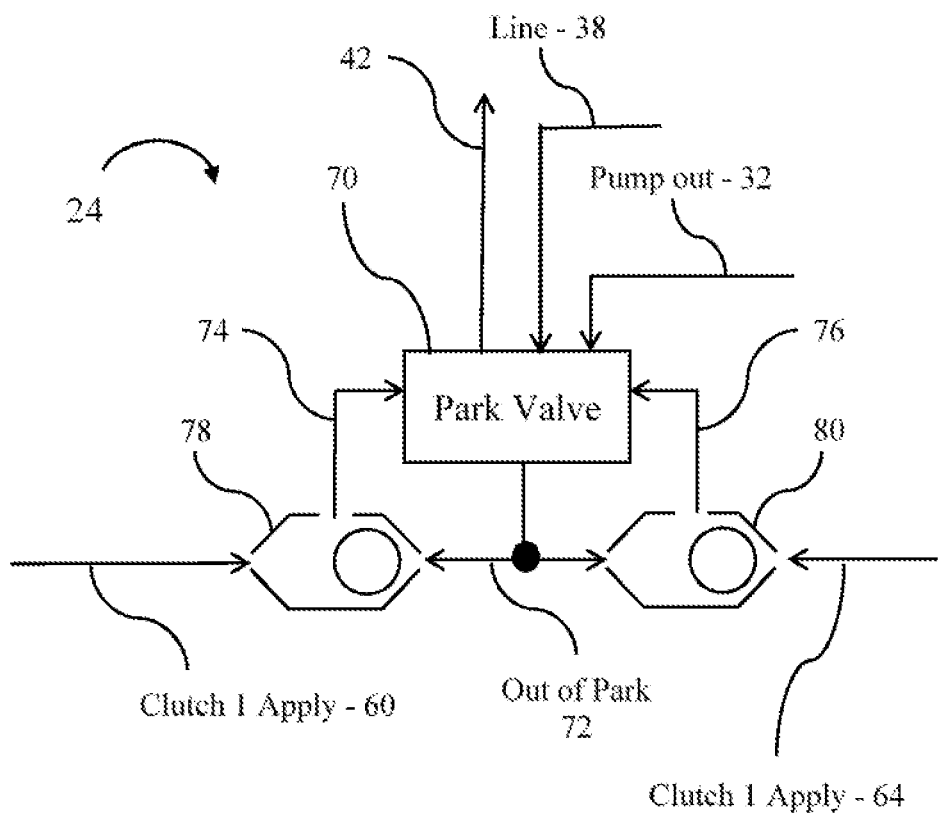
FIG. 4 is a schematic diagram of a park subsystem of a hydraulic control system for the transmission of FIG. 1.

FIG. 4 schematically illustrates the park control subsystem of valve body 24. A spool of park valve 70 is mechanically linked to the park mechanism, such that movement of the spool in one direction engages the park mechanism and movement in the opposite direction disengages the park mechanism. The structure of park valve 70 is described in more detail below. A spring within the park mechanism biases the system toward engagement. Also, pressure in the pump out circuit 32 acts on an area of the spool to bias the system toward park engagement. Park valve 70 fluidly connects an out-of-park circuit 72 to the line pressure circuit 38 when park is disengaged and vents out-of-park circuit 72 when park is engaged. Hydraulic circuits 72 and 76 bias the park valve toward the disengaged position. Check valve 78 fluidly connects circuit 74 to either clutch 1 apply circuit 60 or out-of-park circuit 72, whichever has the higher pressure. Similarly, check valve 80 fluidly connects circuit 76 to either clutch 2 apply circuit 64 or out-of-park circuit 72, whichever has the higher pressure.

When the park mechanism is engaged, both the park mechanism itself and pressure in pump out circuit 32 tend to hold park valve 70 in the engaged position. To disengage the park mechanism, clutches 1 and 2 are engaged by commanding full pressure to apply circuits 60 and 64. Check valves 78 and 80 fluidly connect these clutch apply circuits to circuits 74 and 76 respectively. Pressure in circuits 74 and 76 force the park valve into the disengaged position. Once in the disengaged position, park valve 70 fluidly connects out-of-park circuit 72 to line pressure circuit 38. As a result, the park valve tends to stay in the disengaged position even if clutches 1 and 2 are later released. To re-engage the park mechanism, the pressure in pump out circuit 32 is reduced to a level at which the park mechanism spring forces the park valve to the engaged position. For faster engagement of park, the line pressure may be vented via anti-backflow valve 36 as described above. With the engine running, pump out circuit 32 will have pressure forcing the spool toward the engaged position.

Figure 5:
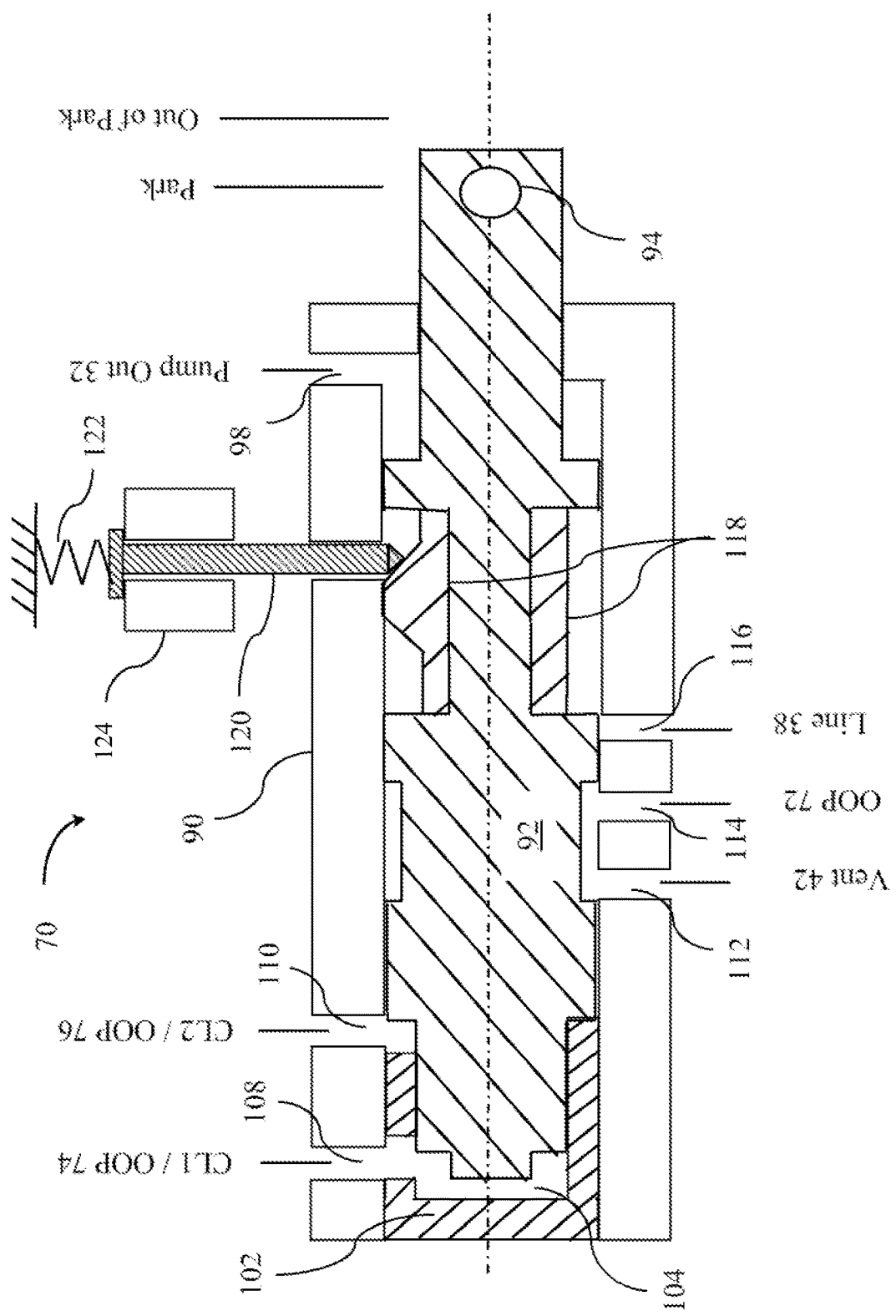
FIG. 5 is a cross section of a park valve assembly of the park subsystem of FIG. 4 in a position corresponding to park engaged.

FIG. 5 shows a cross section of park valve 70 in the position corresponding to Park. The valve includes a housing 90 with a bore and several ports. Spool 92 slides within the bore. Spool 92 is mechanically linked to the park mechanism via a feature such as hole 94. As a result of this linkage with the park mechanism, spool 92 has a specific rotational position within the housing. In other words, it is constrained against rotation about its axis. The park mechanism includes a spring that applies a return force on spool 92 tending to push it to the left (pawl engaged position). Pump out circuit 32 is connected to port 98, biasing spool 92 toward the left, tending to hold the park mechanism in the engaged position.

End cap 102 is fixed to housing 90. End cap 102, housing 90, and spool 92 cooperate to define chambers 104 and 106. Circuits 74 and 76 are connected to ports 108 and 110 respectively to provide fluid to chambers 104 and 106 respectively. Fluid pressure in these chambers act on separate areas of spool 92, biasing spool 92 toward the right. Ports 112, 114, and 116 are connected to vent 42, out-of-park circuit 72, and line pressure circuit 38 respectively. When spool 92 is in the position shown in FIG. 5, it fluidly connects ports 112 and 114 such that the pressure in out-of-park circuit 72 is approximately equal to ambient pressure.

A saddle 118 is supported on spool 92 such that it translates with spool 92 within the bore. Saddle 118 is made of steel whereas spool 92 and housing 90 are made of aluminum. Making the spool and bore from the same material ensures that they expand at the same rate in response to changes in temperature. Therefore, the clearances can be small enough to control leakage without concerns about binding at extreme temperatures. Holding pin 120 is held against saddle 118 by spring 122. In the position shown in FIG. 5, a sloped surface of pin 120 abuts a sloped surface of saddle 118 such that the pin tends to hold spool 92 in the out of park position shown. However, the spring force is relatively light. When current is supplied to solenoid 124, it applies a magnetic force, substantially stronger than the spring force, to pin 120 holding it in engagement with saddle 118.

Figure 6:
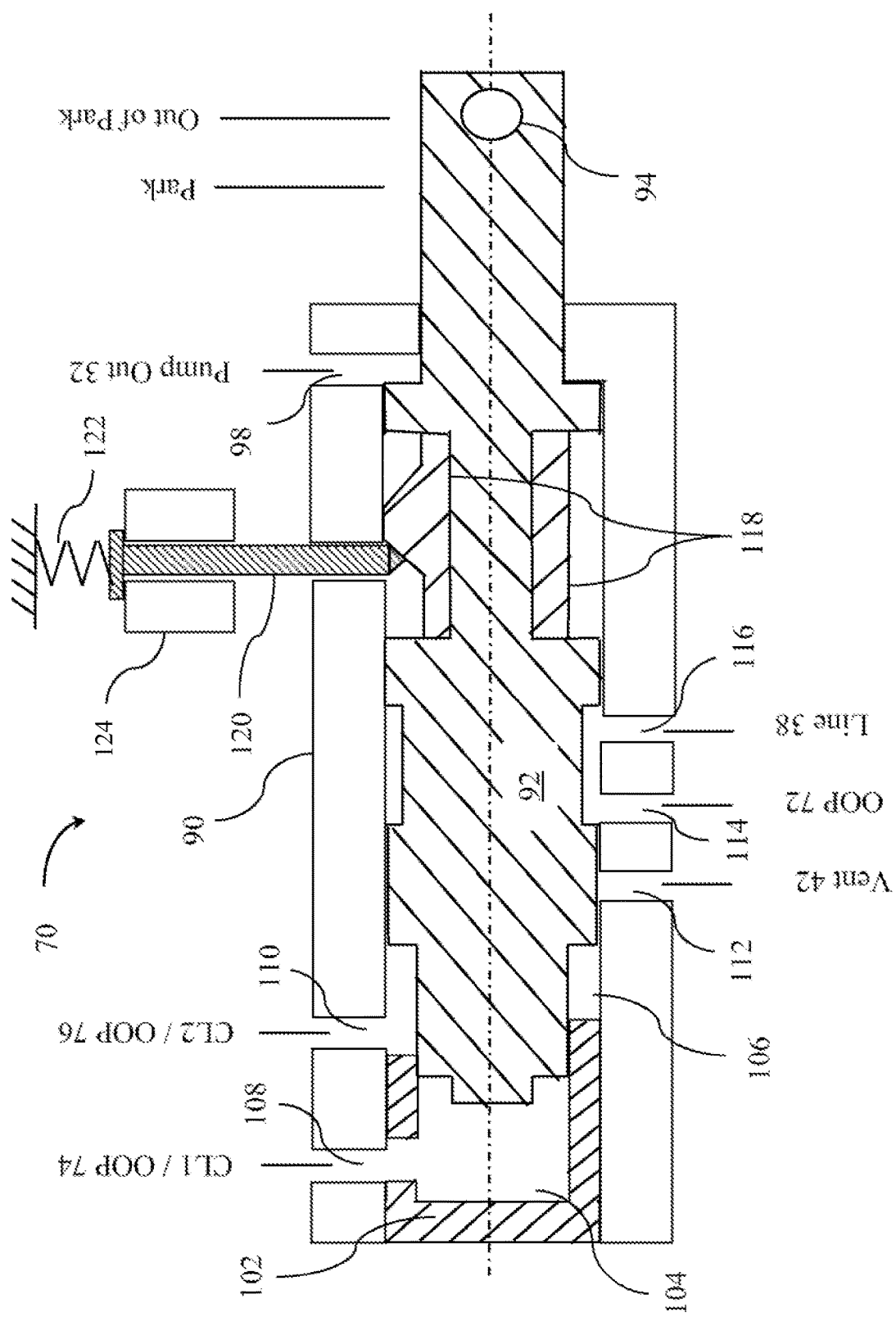
FIG. 6 is a cross section of a park valve assembly of the park subsystem of FIG. 4 in a position corresponding to park dis-engaged.

FIG. 6 shows a cross section of park valve 70 in the position corresponding to Drive, Reverse, or Neutral. The valve is moved from the position of FIG. 5 to the position of FIG. 6 by engaging clutches 1 and 2. The clutch apply pressure of these shift elements act on a larger area on the left side of spool 92 than what pump out pressure acts on the right side of spool 92, causing a net rightward force. When the line pressure is sufficiently high, this net force overcomes the force of the park mechanism return spring, pushing spool 92 to the position shown in FIG. 6 and disengaging the parking pawl. Because the spring pressure from spring 122 is relatively light, it does not interfere with movement of the spool. However, wear can be an issue if the materials are not sufficiently hard. Making the saddle from a hard material such as steel prevents excessive wear.

With spool 92 in this position, port 114 is fluidly connected to port 116 such that line pressure circuit 38 is fluidly connected to out-of-park circuit 72. Due to the behavior of check valves 78 and 80, line pressure will continue to be supplied to ports 108 and 110 even if clutches 1 and 2 are later released.

To re-engage park, clutches 1 and 2 are commanded to the released state and anti-backflow valve 36 is commanded to vent line pressure circuit 38. Then, pressure in pump out circuit 32 acts to move the spool toward the left. Spool 92 may be held in either position regardless of the pressures in various circuits by energizing solenoid 124 to hold pin 120 in engagement with saddle 118.

Figure 7:
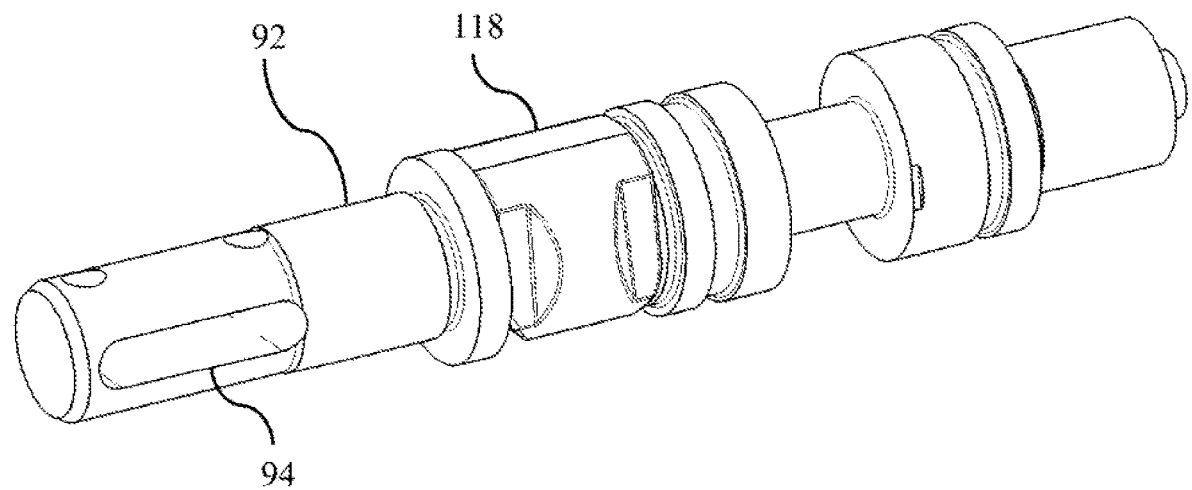
FIG. 7 is a pictorial view of the spool and saddle of the park valve of FIGS. 5 and 6.
Figure 8:
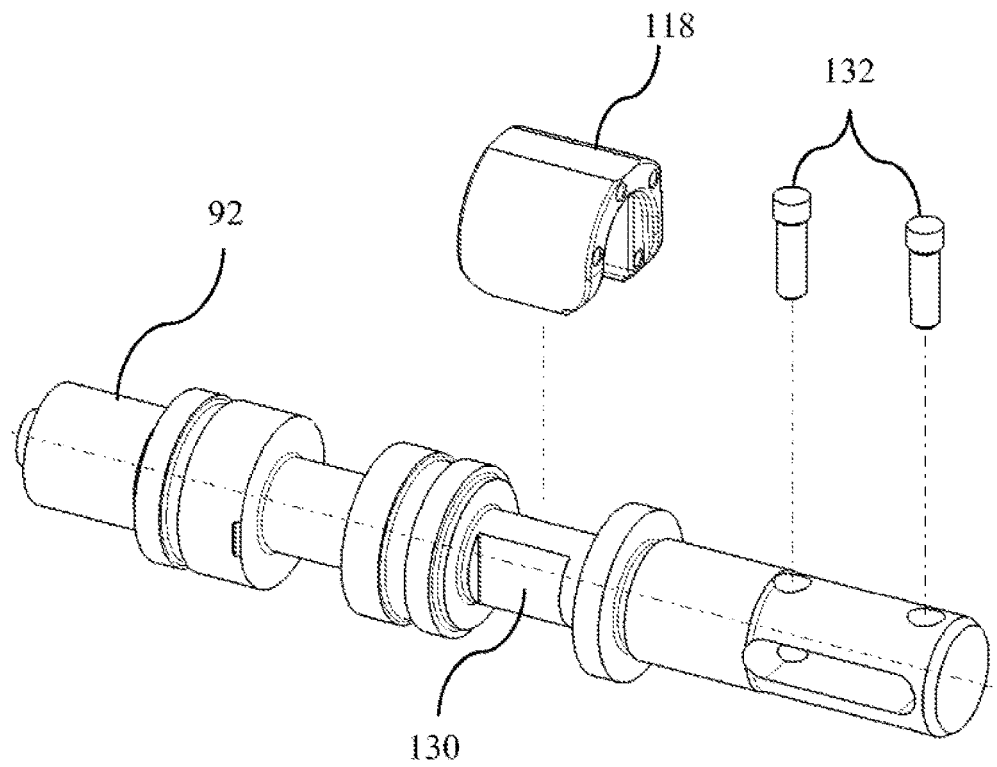
FIG. 8 is an exploded view of the spool and saddle of the park valve of FIGS. 5 and 6.

FIG. 7 is a pictorial view of spool 92 and saddle 118, prior to insertion into the bore. FIG. 8 is an exploded view of spool 92 and saddle 118. Note that a saddle, unlike a sleeve, is open on one side such that it can be installed onto the spool from the side. Note that the spool defines a flat surface 130 which abuts the saddle 118 in the assembled position. This flat surface circumferentially locates the saddle with respect to the spool 92. Pins 132 attach the park mechanism to the spool 92.

Figure 9:
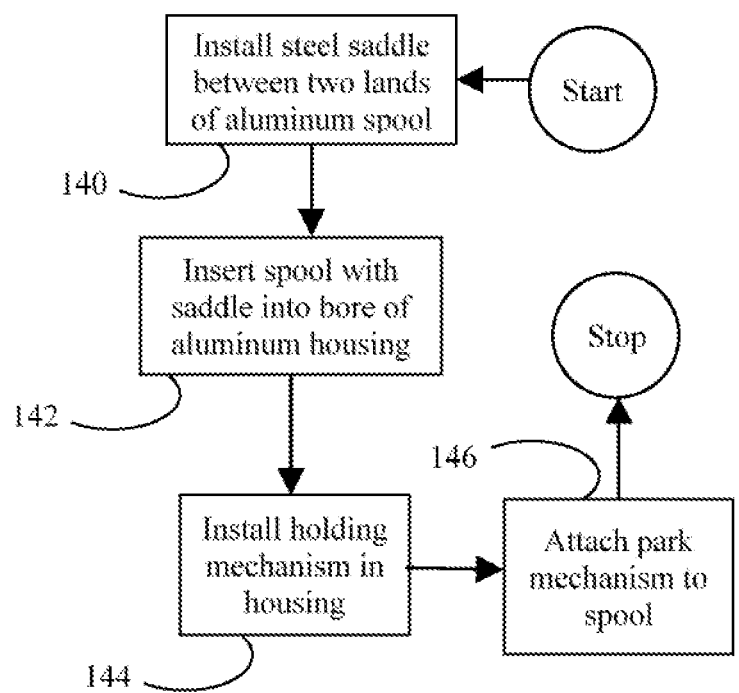
FIG. 9 is a flow chart for a method of assembling the park valve of FIGS. 5 and 6.

FIG. 9 is a flow chart for a method of assembling the park valve of FIGS. 5 and 6. At 140, the steel saddle is installed between two lands of the aluminum spool. The saddle and spool include features, such as flat surfaces, that prevent rotation of the saddle about the spool axis. At 142, the spool, with the saddle, is inserted into a bore in an aluminum housing. At 144, a holding mechanism is installed in the housing. The holding mechanism interfaces with the saddle to hold the spool in position with respect to the housing. At 146, the spool is attached to a park mechanism.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission valve comprising:
a housing defining a bore;
a spool supported to slide within the bore and defining a plurality of lands;
a saddle supported directly on and fixedly mounted to the spool between two lands of the plurality of lands, the saddle having a flat surface abutting a flat surface of the spool to prevent relative rotation; and
a holding mechanism configured to selectively contact a sloped surface of the saddle to prevent movement of the spool with respect to the housing.

2. The transmission valve of claim 1 wherein the spool and the housing are made of a first material and the saddle is made of a second material different than the first material.

3. The transmission valve of claim 2 wherein the first material has a first hardness and the second material has a second hardness greater than the first hardness.

4. The transmission valve of claim 2 wherein the first material is aluminum and the second material is steel.

5. The transmission valve of claim 1 wherein the spool is attached to a park mechanism.

6. The transmission valve of claim 1 wherein the holding mechanism comprises:
a pin supported to slide with respect to the housing into and out of engagement with the saddle;
a spring biasing the pin toward engagement with the saddle; and
a solenoid configured to hold the pin in engagement with the saddle.

7. The transmission valve of claim 1 wherein the spool and the saddle are constrained against rotation within the bore.

8. A valve spool comprising:
a spool body adapted to slide along an axis within a valve bore and defining a plurality of lands; and
a saddle supported directly on and fixedly mounted to the spool body between two lands of the plurality of lands, the saddle having a flat surface abutting a flat surface of the spool body to prevent relative rotation, and the saddle adapted with a sloped surface for engagement with a holding mechanism against the sloped surface to prevent axial movement of the spool.

9. The valve spool of claim 8 wherein the spool is made of a first material and the saddle is made of a second material different than the first material.

10. The valve spool of claim 9 wherein the first material has a first hardness and the second material has a second hardness greater than the first hardness.

11. The valve spool of claim 9 wherein the first material is aluminum and the second material is steel.

12. A method of assembling a transmission comprising:
installing a saddle between two lands of a spool, a flat surface of the saddle abutting a flat surface of the spool to prevent relative rotation;
inserting the spool and saddle into a bore in a housing;
constraining the spool against rotation within the bore; and
installing a holding mechanism configured to selectively directly contact a sloped surface of the saddle to prevent movement of the spool with respect to the bore.

13. The method of claim 12 wherein the spool and the housing are made of a first material and the saddle is made of a second material harder than the first material.

14. The method of claim 13 wherein the first material is aluminum and the second material is steel.

15. The method of claim 12 wherein constraining the spool against rotation within the bore includes attaching the spool to a park mechanism.

* * * * *